Figure 1:
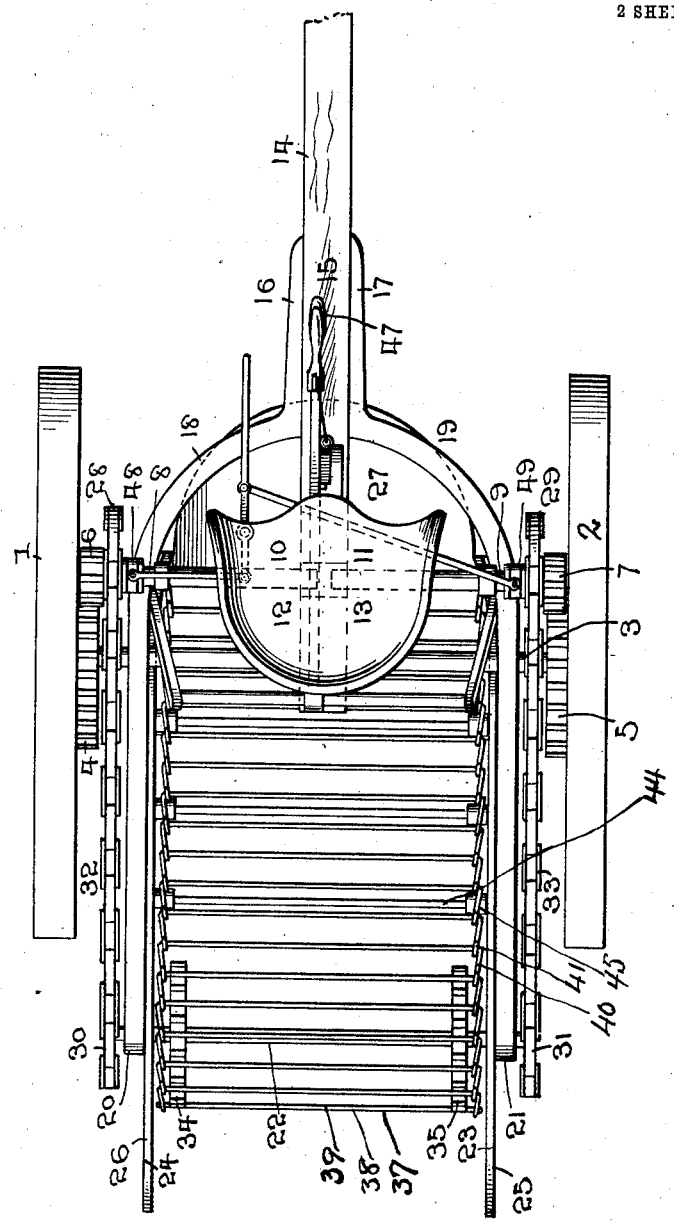

N. F. WALTER.
POTATO DIGGER.
APPLICATION FILED NOV. 25, 1910.

998,433.

Patented July 18, 1911.
2 SHEETS—SHEET 1.

Nathaniel F. Walter, Inventor

Witnesses

By J. L. Atkins
Attorneys

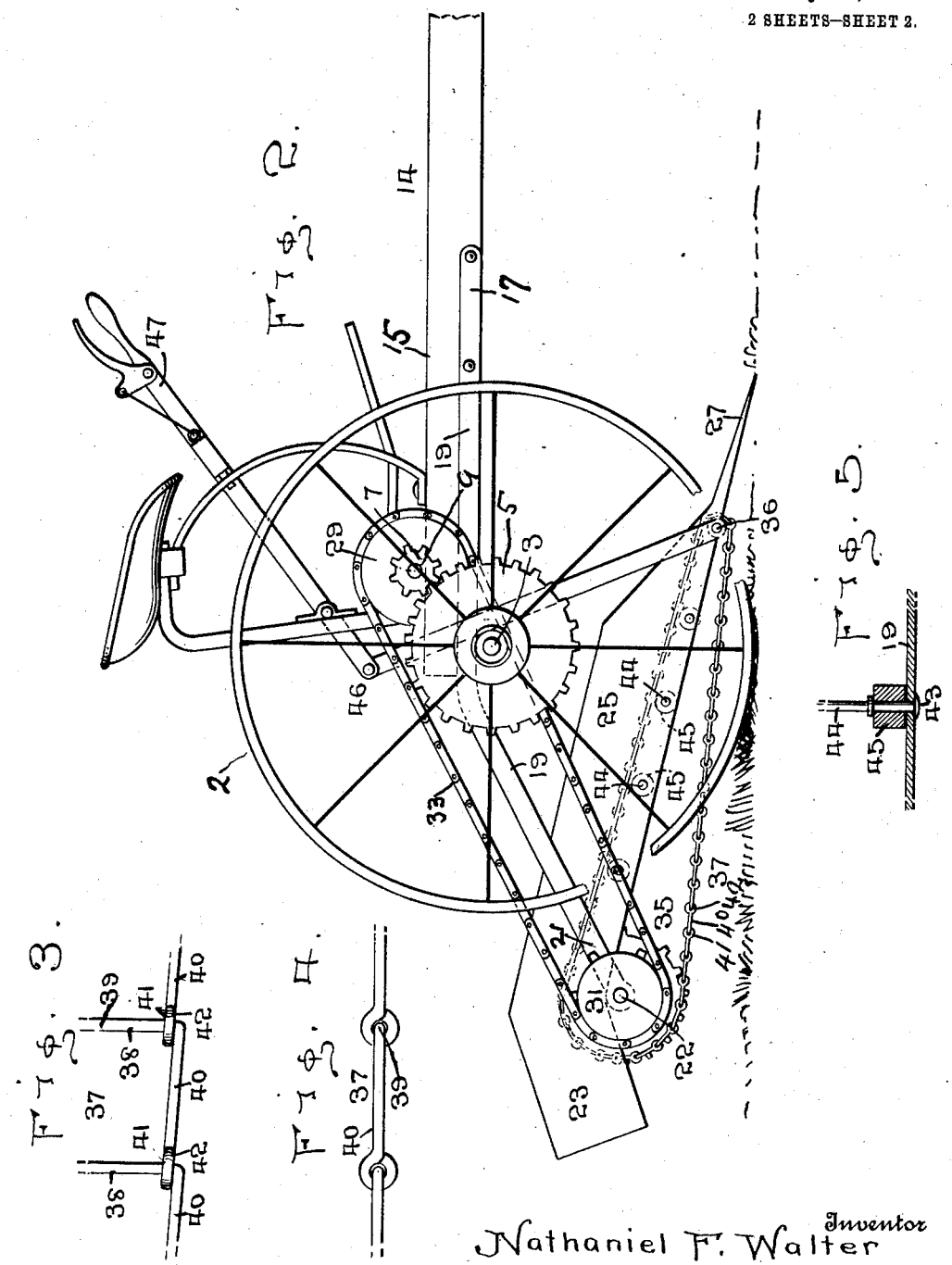

UNITED STATES PATENT OFFICE.

NATHANIEL F. WALTER, OF ONLEY, VIRGINIA.

POTATO-DIGGER.

998,433. Specification of Letters Patent. Patented July 18, 1911.

Application filed November 25, 1910. Serial No. 594,140.

*To all whom it may concern:*

Be it known that I, NATHANIEL F. WALTER, being a citizen of the United States, residing at Onley, in the county of Accomac and State of Virginia, have invented new and useful Improvements in Agricultural Implements—to wit, a Potato - Digger—of which the following is a specification.

This invention relates to a new and useful improvement in potato diggers, and the invention consists in the construction hereinafter pointed out and claimed.

In the annexed drawings, Figure 1 represents a top or plan view of the device. Fig. 2 represents a side view of the device, a small portion of the wheel being broken away. Fig. 3 represents an enlarged detailed plan view of part of the apron. Fig. 4 represents a detailed end view of the apron. Fig. 5 represents a sectional detail thereof.

In these drawings, the numerals 1 and 2 represent a pair of ordinary draft or traction wheels loosely held upon the shaft 3. To the inner face of the hubs of these wheels are rigidly secured toothed wheels 4 and 5. The teeth of these wheels 4 and 5 engage the teeth of spur wheels 6 and 7 arranged in line therewith. These spur wheels 6 and 7 are secured on the outer ends of the short shafts 8 and 9, the inner ends 10 and 11 thereof being held in boxes 12 and 13 in the middle of the frame of the device. These alined shafts 8 and 9 and their boxes 12 and 13 are placed upon the device in front of and above the shaft 3, being at the top of the frame of the device.

This frame consists of a tongue 14, to the rear end of which 15, and in front of the wheel, are secured the forward ends 16 and 17 of bars 18 and 19, which extend backwardly, sidewardly, and then downwardly, having their rear ends 20 and 21 near the plane of the bottom of the wheels. Journaled loosely in these ends 20 and 21 of the sides 18 and 19 of the frame, is a shaft 22, which passes through the ends 20 and 21 and through the ends 23 and 24 of side plates 25 and 26. These side plates 25 and 26 at their front ends carry a scoop 27 which, together with the sides 25 and 26, forms a rigid frame closed at the scoop end, and open between the two sides 25 and 26. Upon the shafts 8 and 9 within the spur wheels 6 and 7 there are rigidly secured sprocket wheels 28 and 29. To the ends of the shaft 22, outside of the ends 20 and 21 of the bars 18 and 19, are rigidly secured sprocket wheels 30 and 31. Chains 32 and 33 pass respectively from the sprocket wheel 28 to the sprocket wheel 30, and from the sprocket wheel 29 to the sprocket wheel 31. Fastened upon the shaft 22 inside the ends 20 and 21 of the bars 18 and 19 near the ends of said shaft 22, there are two toothed wheels 34 and 35. To the forward ends of the plates 25 and 26 at a convenient location, such as just within the upper end of the scoop 27, there is journaled a bar 36. Passing around this bar 36 and over the toothed wheels 34 and 35 is the traveling apron 37 of the device. This apron consists of the several bars 38 consisting of the main or transverse portions 39 and the bent end portions 40 having at their extremities the loops 41. Each bar 38 passes around the next succeeding bar 38 at the loop 42 formed where the end 40 is bent over the main or transverse portions 39. Preferably there are placed at intervals across the spaces between the plates 25 and 26 and firmly held by their ends 43 in such plates, rods 44 on the ends of which are loosely placed rollers 45. As shown in the drawing, the top part of the apron 37 rests on top of these rollers.

Secured to the front end of the frame formed by the plates 25 and 26 and scoop 27 is the lower end of an ordinary lifter 46, the handle 47 of which is conveniently placed for the use of the operator. Also, there may be placed clutch mechanism 48 and 49 so that if desired the sprocket wheels 28 and 29 may throw out of gear when it is desired to turn the device or when it is being conveyed from place to place.

In use the potato digger is drawn forward along a row of potatoes, the scoop 27 catching under the potatoes and lifting them from the ground. As the device is drawn forward the potatoes are forced forward along the scoop and are caught on the traveling apron 37 which is moved by the tractive power of the wheels through the gearing shown and described, the upper part of the apron moving backwardly on top of the rollers 45. The potatoes and earth are thus carried backwardly and upwardly by the apron 37. The broken earth falls down amidst the bars 38 of the apron, said bars being spaced far enough apart to let the earth through and not the potatoes. The potatoes are carried backwardly, passing through the scoop to the ground where they may be gathered in the usual manner.

Having described my invention, what I desire to obtain by Letters Patent is,

A potato digger consisting of an axle, the two traction wheels thereon, each wheel having rigidly secured on the inside thereof a toothed wheel, two alined shafts, boxes in which the inner ends of the said alined shafts are held, the alined shafts and their boxes being above and in front of the axle of the traction wheels, the alined shafts having at their outer ends spur wheels engaging the two toothed wheels of the traction wheels and also sprocket wheels inside of the spur wheels, a tongue, bars secured thereto and extending backwardly, sidewardly and downwardly, side plates having a scoop at the front ends, a shaft passing through the rear ends of the side frames and journaled loosely in the rear ends of the bars secured to the tongue, sprocket wheels and toothed wheels on the shaft at the ends of the bars, chains running from such sprocket wheels to the sprocket wheels on the alined shafts, a bar journaled just within the scoop and a traveling apron passing over such bar and the toothed wheels of the bar at the end of the side bars, whereby is produced a compact and low operating device.

In testimony whereof I have hereunto set my hand in presence of two subscribing witnesses.

NATHANIEL F. WALTER.

Witnesses:
W. C. PARSONS,
V. S. BURTON.

Copies of this patent may be obtained for five cents each, by addressing the "Commissioner of Patents, Washington, D. C."